United States Patent
Orlowski

[11] Patent Number: 5,951,020
[45] Date of Patent: Sep. 14, 1999

[54] BEARING ISOLATOR

[75] Inventor: David C. Orlowski, Milan, Ill.

[73] Assignee: Inpro Companies, Inc., Rock Island, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/802,123

[22] Filed: Feb. 19, 1997

[51] Int. Cl.⁶ .................................................. F16J 15/447
[52] U.S. Cl. .......................................... 277/419; 277/423
[58] Field of Search ...................................... 277/347, 348, 277/352, 407, 412, 418, 419, 420, 423, 427

[56] References Cited

U.S. PATENT DOCUMENTS

| | | | |
|---|---|---|---|
| 3,128,104 | 4/1964 | Teske | 277/56 |
| 4,304,409 | 12/1981 | Orlowski | 277/53 |
| 4,363,490 | 12/1982 | Kuehn | 277/72 FM |
| 4,522,410 | 6/1985 | Holzer | 277/56 |
| 4,881,829 | 11/1989 | Koelsch | 277/53 |
| 5,028,054 | 7/1991 | Peach | 277/57 |
| 5,174,583 | 12/1992 | Orlowski et al. | 277/53 |
| 5,533,737 | 7/1996 | Borowski | 277/55 |
| 5,538,258 | 7/1996 | Hager et al. | 277/57 |

*Primary Examiner*—Anthony Knight
*Assistant Examiner*—John L. Beres
*Attorney, Agent, or Firm*—Rockey, Milnamow & Katz, Ltd.

[57] ABSTRACT

The improved shaft seal assembly is disclosed to permit the use of vapor or a combination of a vaporized substance with a carrier on one side of the seal while preventing the movement of the vapor or the vaporized substance from the housing containing said vapor. This novel seal assembly will be an effective seal both during operation and in a static mode. It will also retain the vaporized substance after coalescence so that it may be reclaimed or reused as desired. The novel seal of this invention provides for coalescence in a radial passage between the stator and a second rotor, thus, avoiding any changes, impediments, or variations with relation to the shaft. The novel seal assembly permits the escape of the carrier from the vessel having the vapor or the vaporized substance with a carrier, while retaining the coalesced substance.

5 Claims, 1 Drawing Sheet

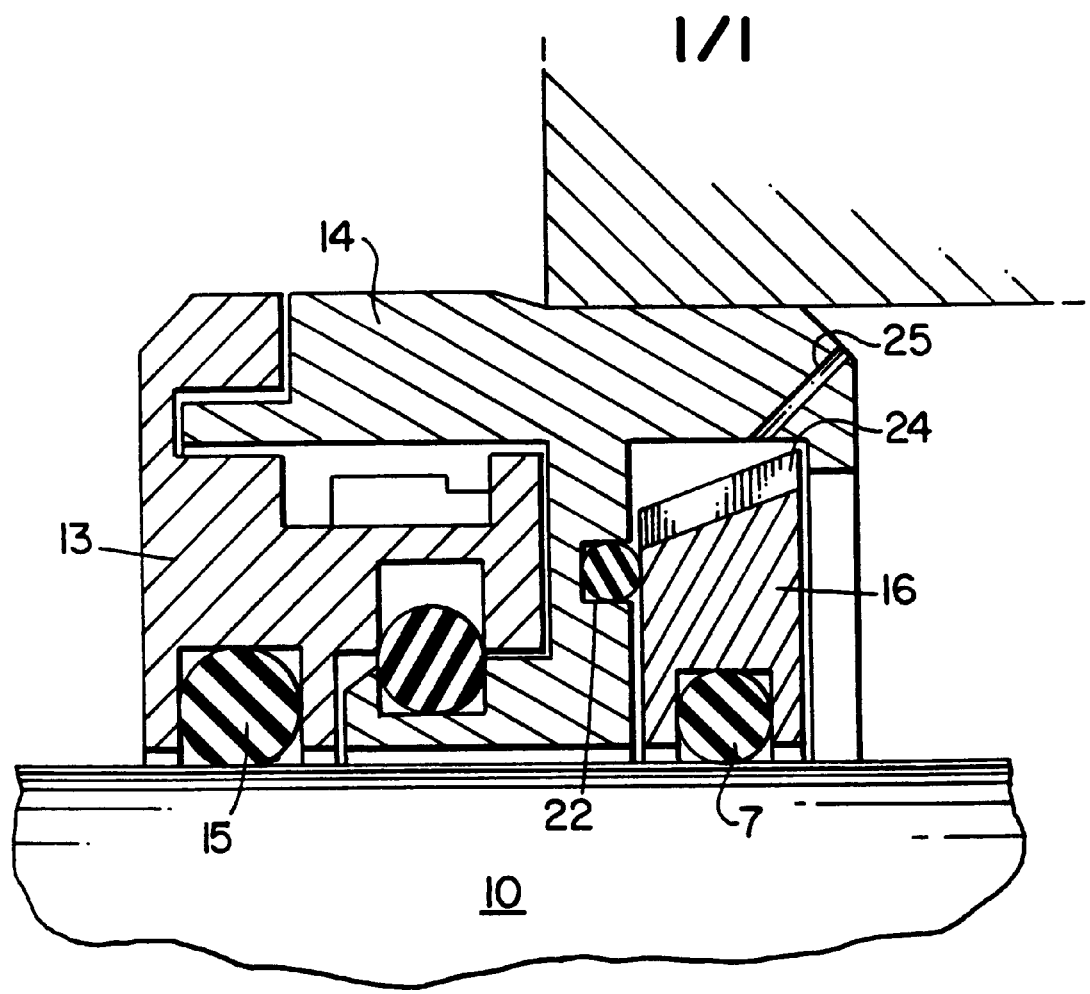

BEARING ISOLATOR

BACKGROUND OF THE INVENTION

This invention is an improvement over my improved bearing isolator described and claimed in U.S. patent application Ser. No. 08/701,815 filed Aug. 21, 1996.

Oil mist lubrication has been widely used in the Hydrocarbon Processing and Primary Metal industries as a means of delivering a constant supply of fresh lubricant directly to the bearings of various types in order to enhance the reliability of the rotating equipment.

Oil mist systems continuously provide a fresh supply of oil film to the bearings, pressurize the bearing housing against outside contaminants and cool the bearings slightly. A mist generator in which petroleum or synthetic lubricant is made into a fine aerosol mist of droplets, measuring 3–5 microns in size, is mixed with carrier air. The mixture is delivered by means of pipes, conduits, and tubings and is delivered automatically under low pressure to the bearing area. A volume of air is continuously exhausted into the workplace area and the air contains oil mist, creating a back pressure in the bearing housing equal to the exit losses incurred. The disadvantage of this oil mist lubrication system is the constant escape of air/oil mist. This is often termed "stray mist" which permeates the entire area around and on the misted equipment.

This stray mist or oil accumulation in the air has been taken care of in an environmental sense by proper ventilation and use of good mistable lubricants to reduce the amount of stray mist to a low level. However, there is always a significant amount of stray oil mist that escapes and is deposited on the surfaces in the workplace despite the best ventilation systems.

Government agencies, namely the Environmental Protection Agency (EPA), has tolerated the mist in the environment because it has not been proven to be harmful when ingested into the human body through inhalation, ingestion, or skin absorption. The most common way is inhalation and the National Institute of Occupation Safety and Health in the United States has established a threshold limit of oil mist in the air as 5 mg. per cubic meter. However, concentrations greater than 0.4 mg. per cubic meter result in a visible haze or cloud of mist, which accumulates on the equipment and surrounding structures, especially the floor, which renders this equipment slippery and unsafe in many ways. In any event, this oil must be cleaned-up and the oily residue disposed of in an environmentally safe manner which requires a great deal of time and money.

This constant loss of oil and the requirements of cleaning it up necessitated a method of providing the advantages of oil mist lubrication without the disadvantages, i.e., loss of oil through the stray mist emitted into the surrounding environment.

Applicant's invention will implement the retention of vapor in a housing. This implementation would remove any visible emission, such as fog, steam, mist, etc., or would be operable with a gas at a temperature below its critical temperature and/or for retention in the housing of the combination of a vaporized substance and air or other carriers. In many instances, such control is needed, such as to prevent steam from entering into a housing containing oil or a substance, such as oil in vapor form.

Applicant's invention has been found to provide absolute control over oil mist escaping into the atmosphere along with the air carrier.

The seal effective for use in containing stray mist or vapors as described in my prior patent application had certain disadvantages, which this present invention overcomes. The prior invention was difficult to install because of the unforgiving nature of the coalescing ring. The ring made of lubricous material, designed to coalesce the liquid did not readily conform to the groove and the outside diameter of the shaft.

The coalescing member also tended, because of its intimate contact with the rotating shaft, to present a possibility of grooving the shaft. Any such grooving would permit leakage of lubricant past the coalescing ring, thereby placing an additional sealing burden on the remaining portion of the seal.

The improved seal of the present invention overcomes any concern of grooving of the shaft by relocating the coalescing ring into the vertical plane in a groove between the stator and a second rotor.

This invention, thus, includes a second rotor, but provides for better coalescence, is easier to assemble and adds centrifugal forces to improve coalescence.

BRIEF SUMMARY OF THE INVENTION

In order to prevent the escape of the lubricant in mist form from a bearing container, this invention controls the mist and coalesces the mist into a liquid form. This coalesced liquid may be drained back into a bearing enclosure sump or other means of accumulating the oil and then removed to waste and/or recovery.

This invention provides for absolute control of the mist lubrication system or any other vapor, including a combination of a vaporized substance and a carrier, by retaining all of the oil or other vaporized substance contained in the mist or vapor within the bearing or housing enclosure. The carrier or air, absent the vaporized substance, may escape the housing.

Any labyrinth seal, but preferably a seal which limits the axial movement between the rotor and stator of the seal may be utilized. The rotor may be driven by any normal drive means with the shaft about which the rotor is situated. The stator member is firmly sealed to the housing or vessel, which in the case of oil mist may enclose the bearing member.

This invention provides for a second rotor, which is axially contained within the stator and has a face which runs adjacent a stator face. This rotor is located axially along the shaft away from the first rotor. There is a groove in the stator face opposite the second rotor and the coalescing member is inserted into this groove in the stator. The coalescing member is necessarily made of lubricous material. A Teflon® or derivative cord or ring placed into the collection groove in the stator and in intimate contact with the second rotor works excellently. This collection or coalescing member is sized and inserted into a groove that is machined into the stator so that it gently but intimately contacts the second rotor. This coalescing ring may be slightly expanded or flattened at the interface with the rotor in order to increase the area of the coalescing surface.

This coalescing member is in intimate contact between the stator and the second rotor for a wear in fit. The coalescing member wears or sublimates to line-to-line contact between the second rotor and the ring. When the mist or vapor containing oil or other vaporized substance impinges or encounters the coalescing member, the vaporized substance coalesces. The second rotor may also be machined with veins on the periphery in order to promote turbulent flow and accelerate and improve the coalescing of the vapor or mist. Laminar flow does not promote coalescing to the same degree as turbulence. The above improvements are also operable with any vapor or combination of vaporized substance with a carrier coalescing and retaining any substance in a vessel while the carrier, itself, may escape.

DESCRIPTION OF THE DRAWINGS

FIG. 1—is a sectional view showing in detail the assembly of the seal into the housing including first and second rotors and the stator.

DETAILED DESCRIPTION OF THE INVENTION

The prior art was discussed in my prior application and the invention of the prior application was thoroughly described. The novel seal of this invention is shown with the stator 14 affixed to the housing and the rotor ring 13 affixed to the shaft 10 by means of a friction seal 15. The second rotor ring 16 is also affixed to the shaft 10 by means of the frictional seal 17. Once again, the seal except for the novel members to be discussed later may be any labyrinth type seal, though the one shown herein is described in detail in U.S. Pat. No. 5,378,000 in Columns 2 to 3. The labyrinths and passages of this particular seal are fully described in the referenced patent.

A return trough 25 is milled into the stator 14 so that the coalesced liquid may be directed back into a sump. The trough 25 will also accept impelled liquid lubrication that is thrown off by the rotation of second rotor 16.

The stator 14 is shown with a metal-to-metal engagement of the stator to housing fit, but a gasket (not shown) may be utilized if so desired.

This novel seal also prevents the co-mingling of the vaporized or coalesced substance and the solid or liquid substance on the other side of the seal.

Having described the preferred embodiment, other features of the present invention will undoubtedly occur to those versed in the art, as will numerous modifications and alternations in the embodiments of the invention illustrated, all of which may be achieved without departing from the spirit and scope of the invention as defined in the appended claims.

What is claimed is:

1. A seal for a shaft exiting the housing, having vapor in the seal housing, the seal affixed to said housing and surrounding said shaft including:
   a) said seal comprising;
      1) a stator affixed to said housing;
      2) a first rotor rotating with and surrounding said shaft;
      3) labyrinths between said first rotor and said stator;
      4) a second rotor axially separated from said first rotor by said stator and rotating with and surrounding said shaft;
      5) a passage between said second rotor and said stator;
      6) at least one groove in said stator;
      7) said second rotor including at least one vane near its periphery;
      8) lubricious material in said groove an intimate contact with said second rotor to coalesce said vapor.

2. The seal in accordance with claim 1, wherein said second rotor having its periphery angled with ever increasing diameter away from said groove.

3. A seal for a shaft exiting a housing having vapor in the housing affixed to the housing and surrounding said shaft said vapor consisting of a combination of a vaporized substance and a gaseous carrier including:
   a) said seal comprising;
      1) a stator affixed to said housing;
      2) a first rotor rotating with and surrounding said shaft;
      3) labyrinths between said first rotor and said stator;
      4) a second rotor axially separated from said first rotor by said stator and rotating with and surrounding said shaft;
      5) a passage between said second rotor and said and said stator;
      6) at least one groove in said stator;
      7) said second rotor having its periphery angled with ever increasing diameter away from said groove;
   b) lubricous solid material placed in said groove, an intimate contact with said second rotor to coalesce said vapor into a gaseous carrier and said substance.

4. A seal for a shaft exiting a housing having vapor in the housing affixed to the housing and surrounding said shaft said vapor consisting of a combination of a vaporized substance and a gaseous carrier including:
   a) said seal comprising;
      1) a stator affixed to said housing;
      2) a first rotor rotating with and surrounding said shaft;
      3) labyrinths between said first rotor and said stator;
      4) a second rotor axially separated from said first rotor by said stator and rotating with and surrounding said shaft;
      5) a passage between said second rotor and said and said stator;
      6) at least one groove in said stator;
      7) said second rotor having its periphery angled with ever increasing diameter away from said groove;
      8) said second rotor including at least one vane near its periphery;
   b) lubricous solid material placed in said groove, an intimate contact with said second rotor to coalesce said vapor into a gaseous carrier and said substance.

5. A seal for a shaft exiting a housing having vapor in the housing affixed to the housing and surrounding said shaft said vapor consisting of a combination of a vaporized substance and a gaseous carrier including:
   a) said seal comprising;
      1) a stator affixed to said housing;
      2) a first rotor rotating with and surrounding said shaft;
      3) labyrinths between said first rotor and said stator;
      4) a second rotor axially separated from said first rotor by said stator and rotating with and surrounding said shaft;
      5) a passage between said second rotor and said and said stator;
      6) at least one groove in said stator;
      7) said second rotor including at least one vane near its periphery;
   b) lubricous solid material placed in said groove, an intimate contact with said second rotor to coalesce said vapor into a gaseous carrier and said substance.

* * * * *